Patented July 7, 1953

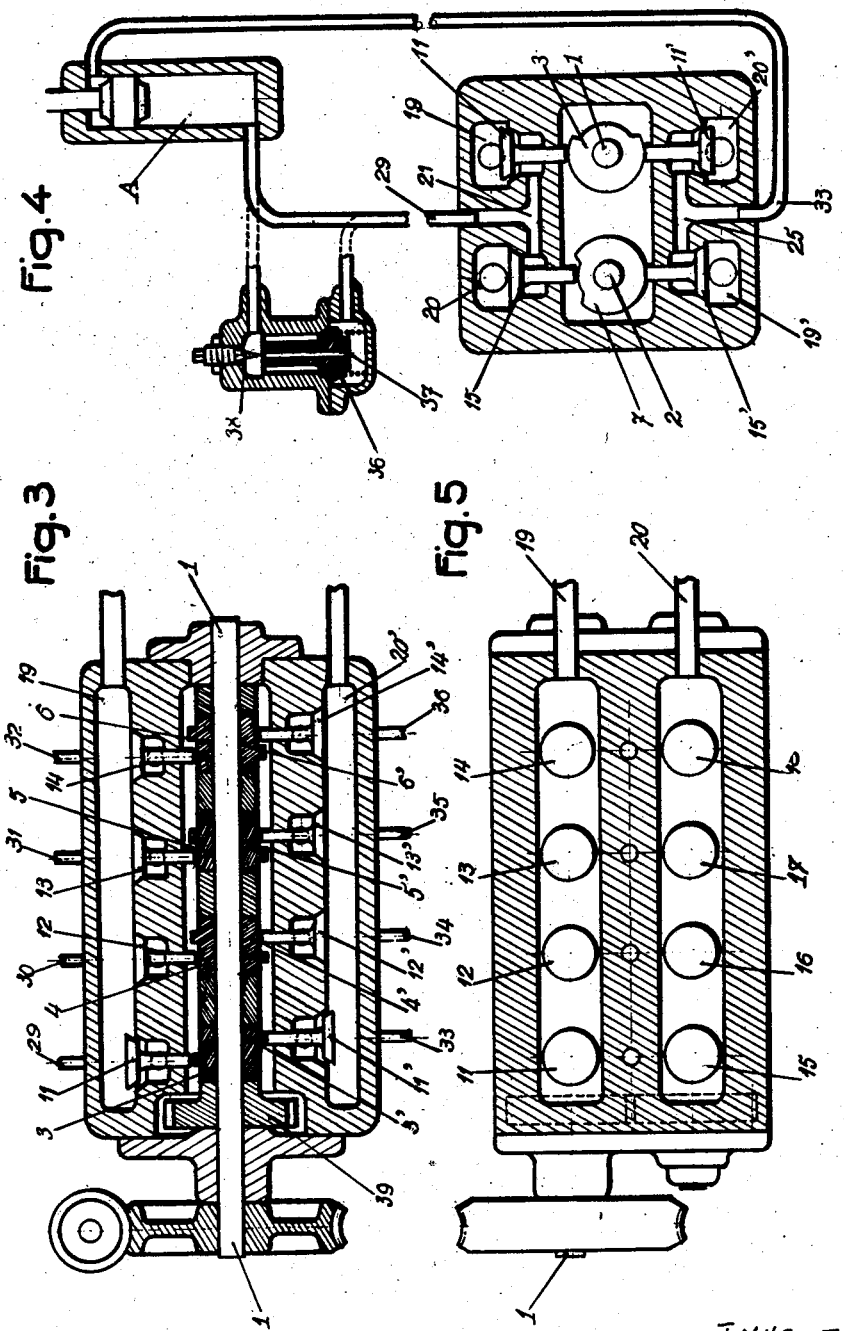

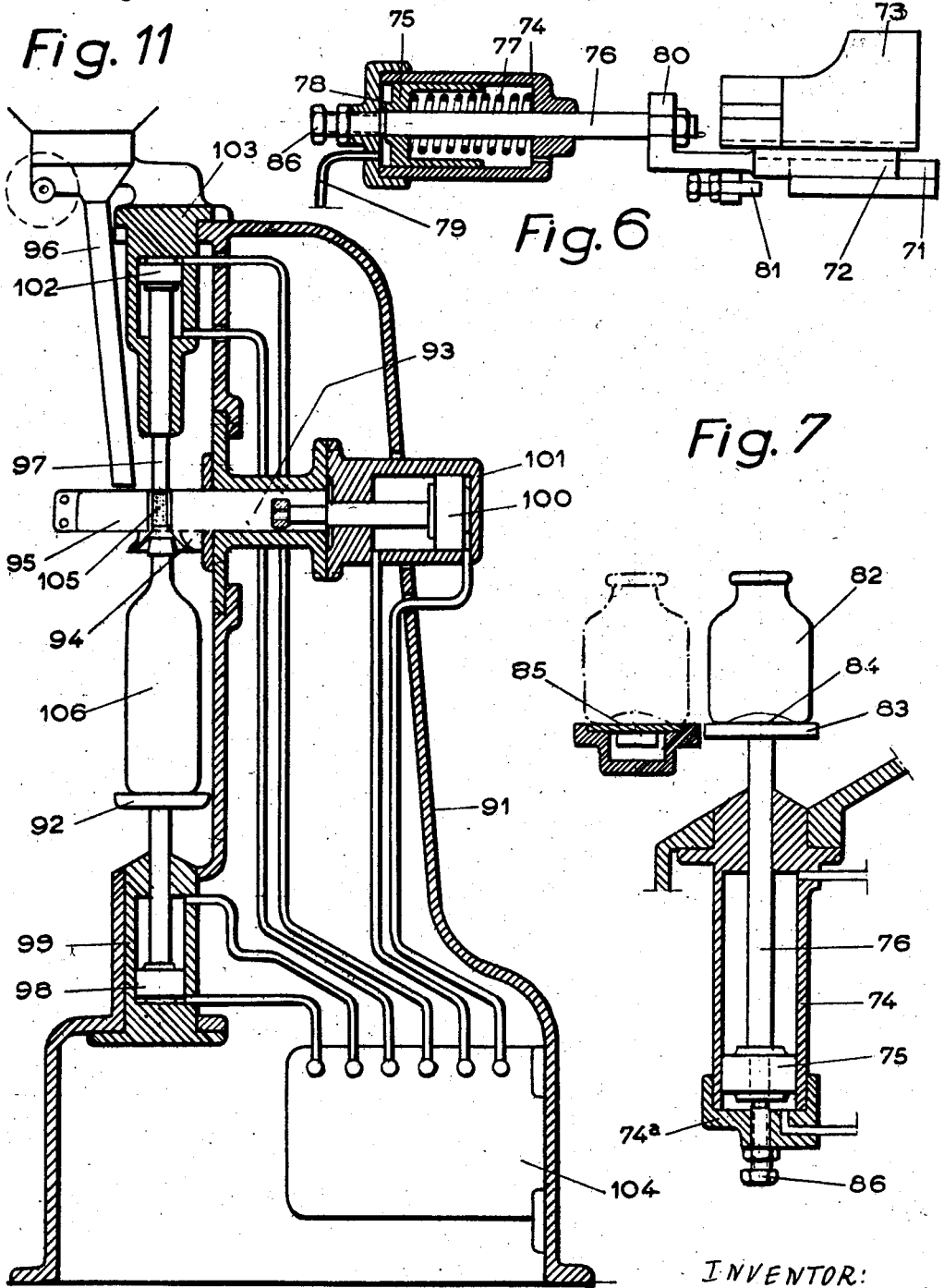

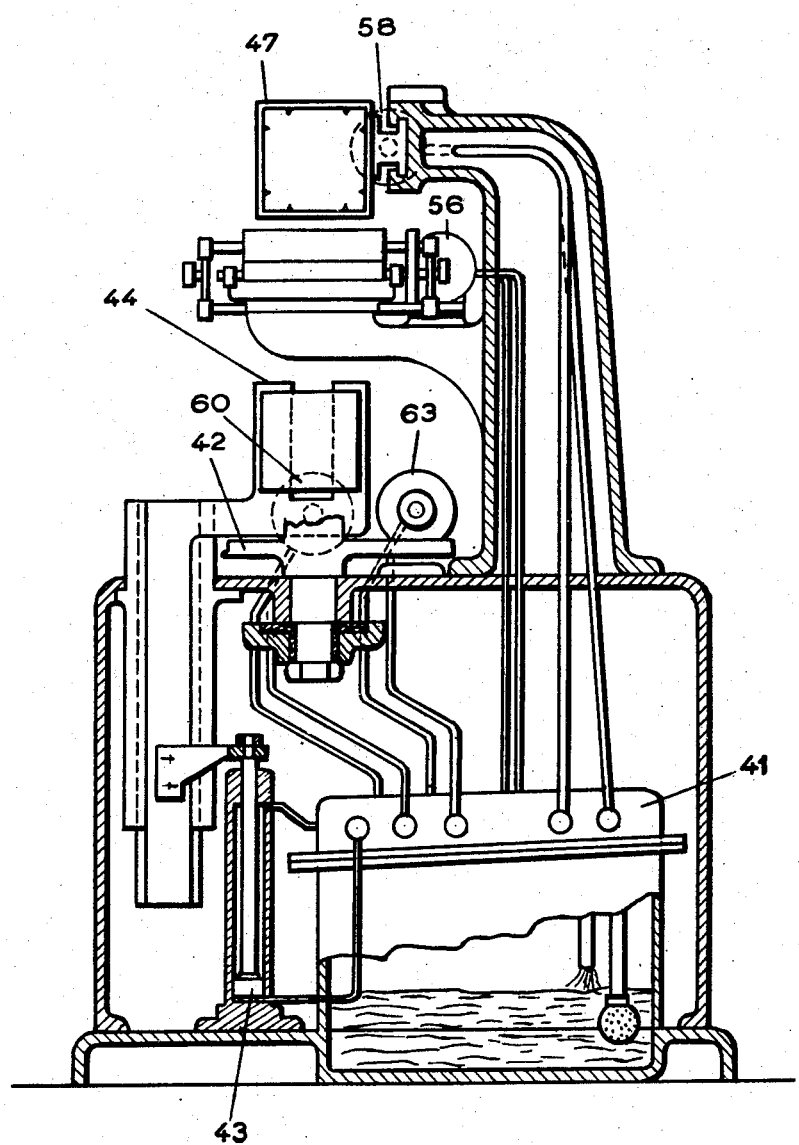

2,644,310

UNITED STATES PATENT OFFICE 2,644,310

PLURAL MOTOR HYDRAULIC DEVICE FOR CONTROLLING THE MOVEMENTS IN MACHINES AND APPARATUS FOR WASHING, FILLING, STOPPERING, CAPSULING, AND LABELING BOTTLES

René Détrez, Nogent-sur-Marne, France

Application August 21, 1947, Serial No. 769,843
In France June 23, 1944

Section 1, Public Law 690, August 8, 1946
Patent expires June 23, 1964

7 Claims. (Cl. 60—97)

The present invention relates to the hydraulic transmission and control of mechanical movements, and more particularly that of the up and down movements of the supports for containers, in machines for washing, filling, stoppering, capsuling, labelling, etc. bottles and other objects, and also the transmission and the control of the reciprocating movements of the operative members in such machines.

It applies both to the individual machines and to groups of machines which are synchronized with one another, the various movements of which have to be effected in an absolutely accurate cadence and sequence.

It is known that, in such machines or groups of machines, the said movements are usually obtained by means of kinematic combinations such as: levers, connecting rods, clutches, etc. and that very often said movements are noisy, are complicated and intermingled, and that they make the machine parts inaccessible both for maintenance and adjustment.

The present invention has been designed for the purpose of obtaining a machine comprising the following: firstly, the greater part of its movements are effected hydraulically; secondly, silent movements without vibration are obtained; thirdly, the maximum safety is effected, in particular during abnormal stresses; fourthly, the moving members are positioned so that they are simple and easy to service and readily accessible, the delicate members being centralized and completely enclosed in a case continually having oil in circulation.

With this end in view, the combinations of levers or other conventional mechanism have been replaced by pistons which are operated, in cylinders, by a pressure liquid, preferably oil, itself supplied through an appropriate distributor.

When it is necessary to distribute the pressure liquid to driving cylinders controlling fairly numerous movements, certain distributors, such as those operating with a slide-valve for example, may lead to a fairly considerable bulk and to costly construction. Furthermore, they may involve dead periods during each change of direction of the pistons which they operate.

The integration of the driving cylinders controlling the up and down and the reciprocating movements, with the system for the distribution of the liquid incorporated in the device according to the present invention, has enabled the drawbacks hereinbefore mentioned to be eliminated to a considerable extent.

This arrangement therefore finally permits:
(a) replacing the kinematic combinations by means of levers, connecting rods, etc., which are usually used in the up and down and reciprocating motions of the aforesaid machines, by very simple driving cylinders; (b) of eliminating all moving members between said cylinders and the distributor which supplies them with pressure liquid, the said cylinders being solely connected to the distributor by two fixed pipes; (c) of centralizing and enclosing in a liquid-tight case all the delicate members of the device, said members being simultaneously shielded from any undesirable projection of oil or broken glass, shielded from any impact, and protected from any wear owing to the fact that they move very slowly and constantly in oil; (d) of reducing the moving masses to a minimum and of eliminating all vibration.

Fig. 3 is a view in longitudinal section of the distributor producing, at the required instants and times, the aforesaid up-and-down and reciprocating movements.

Fig. 4 is a transverse section of the distributor in question, to which has been added, on the one hand a driving hydraulic motor consisting of a cylinder and a piston, so as to show the successive functions of the valves controlling the various evolutions of its piston, and on the other hand a throttle valve which is necessary in certain cases.

Fig. 5 is a sectional plan view of the said distributor of Fig. 3.

Fig. 6 is an elevational view, partly in section, of the application of the invention to the control of a supporting carriage of a label box of labelling machines, of a hydraulic cylinder in which one of the two strokes is produced by supplying the pressure liquid to a hydraulic piston, the other stroke being produced by the expansion of an opposing spring which is compressed by the hydraulic piston during its operative stroke, said spring pushing the hydraulic piston back towards its starting point as soon as said piston has been relieved of the pressure of the liquid which was being exerted thereon.

Fig. 7 is a sectional elevation of the application of the invention to the up and down motion of a machine for filling, stoppering, or capsuling, or of any other like machine, and in particular in the case of machines provided with an automatic inlet and outlet of the bottles.

Fig. 8 is a front elevational section, showing a labelling station in which the bottle to be labelled is carried in the vertical position by a rotary turret shown fragmentarily.

Figure 9:
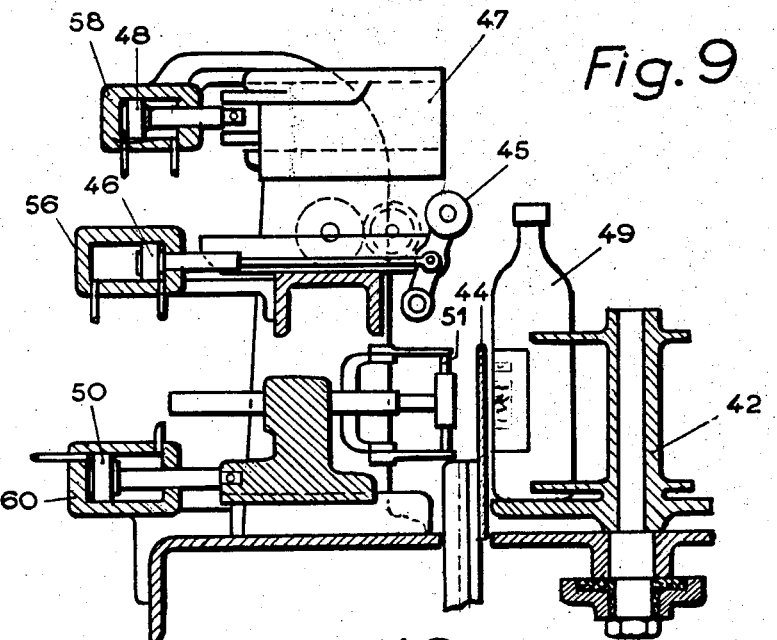

Fig. 9 is also an elevational section, but a side view.

Figure 10:
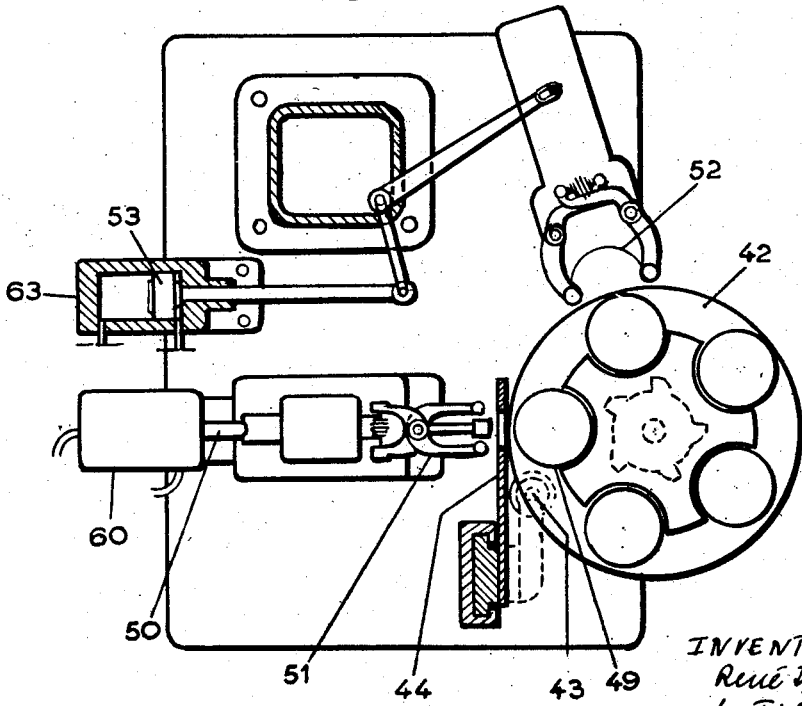

Fig. 10 is a top plan view of the table carrying the bottle-carrier turret and the members for affixing and smoothing the label.

Fig. 11 is a sectional elevation of the invention.

Figure 1:
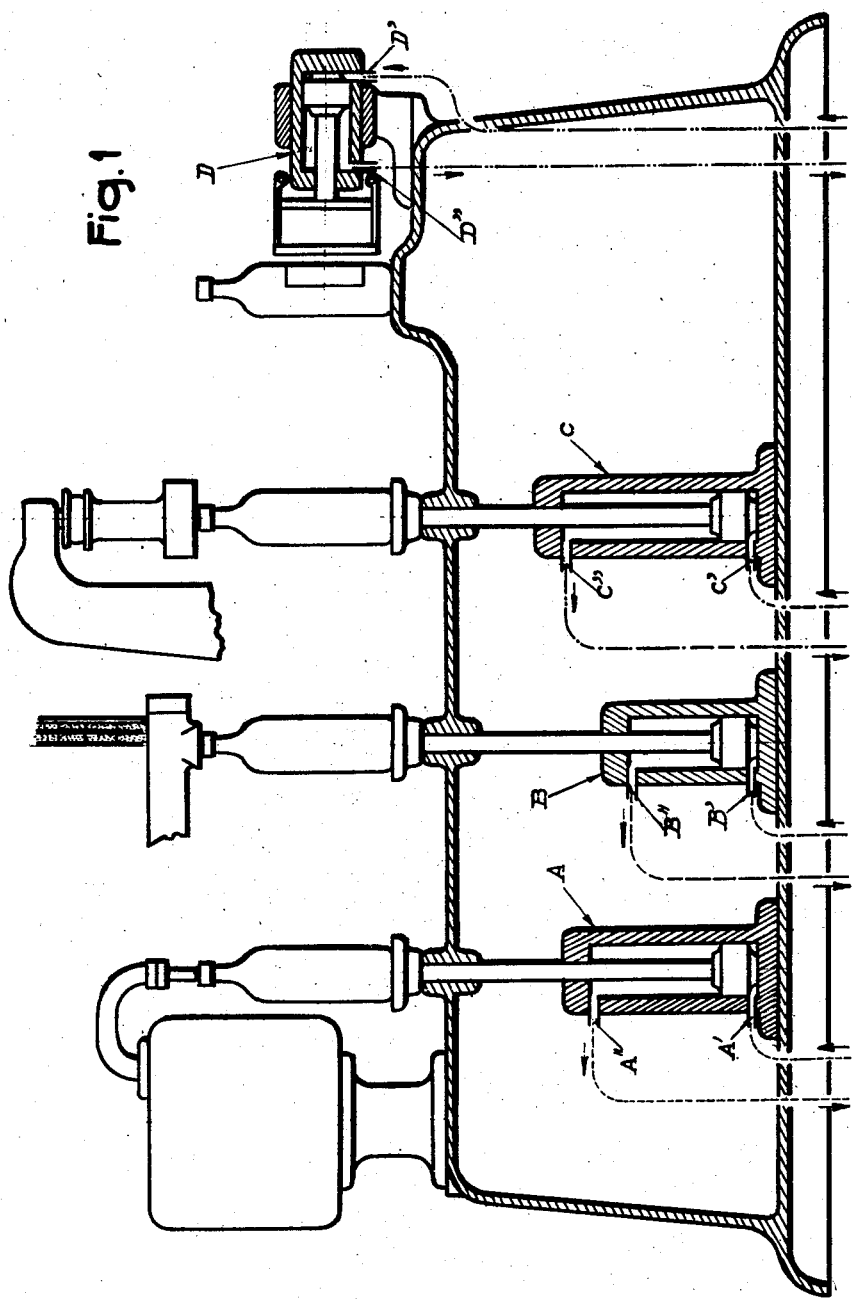
Figs. 1 and 2 are diagrammatic views of the device applied to the control of the up-and-down and reciprocating members of four machines or parts of machines synchronized with one another.

In Fig. 1, the hydraulic motor A may, for example, have the function of imparting the up-and-down motion to a bottle support of a bottle filling machine; B may operate that of a stoppering machine; C that of a capsuling machine and D may impart the reciprocating movement to labelling members of a labelling machine.

Figure 2:
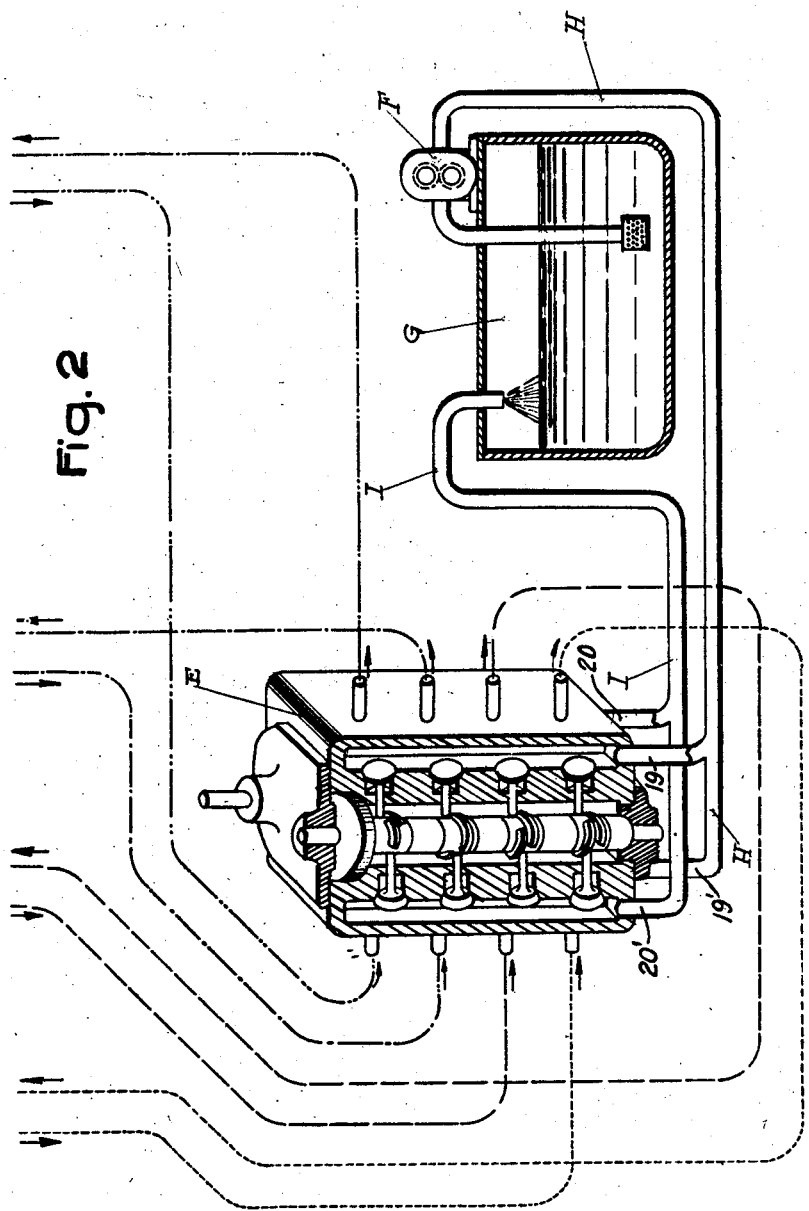

In Fig. 2, E represents the assembly forming the distributor of pressure liquid to the aforesaid members; F is the pump delivering the pressure liquid to the distributor E and thence, to the hydraulic motors to be actuated; G is the liquid reservoir supplying the pump F and receiving the liquid exhausted from the hydraulic cylinders during each stroke of the pistons within said cylinders. The pipe H supplies the pressure liquid to the distributor, and the pipe I returns the said liquid from the distributor to the reservoir G.

Each of the cylinders of motors A, B, C and D is provided with two ports: A' and A" for the cylinder of motor A; B' and B" for the cylinder of motor B and so forth. Said ports act alternately as inlet ports and exhaust ports for the liquid supplied by the pump.

In Fig. 1, the pistons are assumed to be in position for starting the "forward" stroke and the arrows indicate, on the one hand, the direction of the thrust of the liquid during the operation of the phases shown, and on the other hand the direction of its exhaust during these same phases.

In Figs. 3, 4 and 5, the cam shaft 1 is assumed to receive its drive from any drive shaft of the machines to which the device according to the invention is applied. Said cam shaft 1 drives the cam shaft 2 by means of a pair of spur gears 39 or their equivalent.

The cam shaft 1 carries the cams 3, 4, 5, 6 and 3', 4', 5' and 6', respectively operating the valves 11, 12, 13, 14 and 11', 12', 13' and 14'. For its part, the cam shaft 2 carries the cams 7, 8, 9, 10 and 7', 8', 9' and 10' respectively operating the valves 15, 16, 17, 18 and 15', 16', 17' and 18'. (The cams 8, 9, 10, 7', 8', 9' and 10', and also the valves 16', 17' and 18' are not shown in the figures.)

Two inlet pipes for the liquid 19 and 19' receive the liquid supplied under pressure to the pipe H by the pump F but said liquid only reaches the cylinders of motors A, B, C, D when the inlet valves 11, 12, 13, 14, 11', 12', 13' and 14' open.

Two exhaust pipes for the liquid 20 and 20' communicate with the liquid reservoir G through the pipe I, but they only receive the liquid exhausted from the aforesaid motor cylinders when the valves 15, 16, 17, 18, 15', 16', 17' and 18' open.

Between the small chamber which is located below each of the inlet valves for the liquid towards one of the sides of the cylinders and the chamber located below each of the exhaust valves for the liquid driven out of the same side of the said cylinders, is a duct 21 (22, 23, 24), 25 (26, 27, or 28) which places the valves respectively in communication: 11 with 15, 12 with 16, 13 with 17 and so forth.

Each of said ducts communicates respectively with the pipes 29, 30, 31, 32, 33, 34, 35 and 36 which are connected to the ends of the motor cylinders.

Owing to the fact that the chambers of the inlet valves are connected to those of the exhaust valves for the liquid, the pipes 29, 30, 31, etc., are common to these two chambers and the said pipes act alternately, as pipes for supplying the pressure liquid to the cylinders, and as pipes for the return of the said liquid from said cylinders to the pipes 20 and 20' of the distributor. This arrangement enables the number of pipes at the outlet of this apparatus to be reduced.

It should also be noted that the valves 11 and 11', 12 and 12', 13 and 13', etc., are respectively arranged in staggered relation and each operated by its own cam, thereby enabling each of said cams to be given the most appropriate shape. These cams may be coupled two by two, as in the example shown, so as to reduce the number of parts, while each retaining the best shape for operating the valve which it controls.

These cams are juxtaposed on the two cam shafts 1 and 2, and their setting is such that the cams 3, 4, 5 and 6, on the one hand, and 7, 8, 9 and 10 on the other hand, respectively lift the valves 11, 12, 13, 14, 15, 16, 17 and 18, the said valves being lifted simultaneously two by two; the exhaust valve 11' opening at the same time as the inlet valve 11, 12' opening at the same time as 12, 13' opening at the same time as 13, and so forth.

Following the cycle of operations on one of the fluid motors, the motor A for example, the operation is as follows (see Fig. 4):

The cam shaft 1 lifts the inlet valve 11 and the liquid supplied under pressure to the pipe 19 flows into the duct 21. The exhaust valve 15 being closed, the liquid can only flow through the pipe 29 and, thence, towards the bottom of the motor cylinder. At the same time as the inlet valve 11 opens, the exhaust valve 11' opens (simultaneously as stated), placing the pipe 33 (connected to the top of the motor cylinder) in communication with the pipe 20', itself in communication with the liquid reservoir G through the pipe I.

The piston of said motor cylinder has therefore moved upwards and it remains in its position throughout the predetermined duration. When the said piston is to move downwards again, the valves 11 and 11' close and as soon as they have closed, the valves 15 and 15' open, permitting the pressure liquid supplied through the pipe 19', to flow into the duct 25 and the pipe 33 and reach the top of the motor cylinder, and the liquid previously supplied to the cylinder to be exhausted through the pipe 29 and the duct 21 and to flow back through the pipe 20 and return to the reservoir G.

In the operation of this assembly for all the other movements, which may take place together or independently of one another, it is possible for some of them to take place while others stop.

When certain movements are to be slow, it is conventional in hydraulic systems to use a throttle gate or valve on the pipe supplying the pressure liquid to the fluid motor actuated. But this has the result of also braking the return of the piston.

Now, in machines for capsuling containers, for example, it may be desirable to obtain a slow upward movement of the container at the instant when the cap is being crimped, and then a comparatively quick downward movement of the said container. This result is readily obtained with the arrangement shown in Fig. 4.

The valve 36 shown in said Fig. 4 has been provided for this purpose. It throttles the passage for the liquid in one direction only, and if it is desired to have a slow motion of the piston operating the container support, it is possible:

(1) either to place the said valve on the pipe leading to the bottom of the cylinder and in this case it is arranged as indicated in Fig. 4 in such a manner that it is pressed against its seat by the thrust of the liquid supplied under pressure, said thrust being added to that of the bearing spring for the said valve;

(2) or to place the said valve on the outlet pipe for the liquid on the opposite side of the cylinder. In this case the said valve is also arranged in such a manner that it is pressed against its seat during the exhaust phase of the liquid.

The braking of the upward movement of the piston in the cylinder of motor A is obtained on the one hand, by means of the opening 37 of the valve in question, which opening may be provided as small as necessary; on the other hand, by means of the needle valve screw 38, the point of which can penetrate more or less into the opening 37 so as to decrease the passage cross-section available for the liquid supplied under pressure, thereby forming an additional braking and adjusting means.

During the "return" stroke of the piston in the cylinder of motor A, the valve 36 is lifted off its seat and leaves an ample passage for the liquid driven out, the cross-section of which passage may be as large as necessary. The screw 38 being independent of the valve 36, it can on the one hand be adjusted from the outside, and on the other hand it cannot hinder the movements of the said valve.

When it is desired to brake the movement in the opposite direction, it is only necessary to reverse the aforesaid positions of the said throttle valve.

From the foregoing description, it is therefore apparent that the device according to the present invention firstly, enables the kinematic combinations usually used, to be replaced by very simple hydraulic motions; secondly, enables, in the case of a plurality of machines or apparatus, the number of members and the bulk thereof to be reduced; thirdly, enables the safety of operation to be increased, hydraulic forces being more readily limited to a predetermined maximum value than mechanical forces; fourthly, enables servicing to be more easily effected by eliminating a considerable part of the movable members and by protecting all the control members of the main motions in a liquid-tight case in an oil circulation; fifthly, enables the wear of the members to be decreased, since they rotate very slowly, in a protected chamber and in oil; sixthly, make it possible, if necessary, to eliminate the dead periods at the end of each stroke of the pistons operated, by adjusting the points of opening and closing of the valves concerned, in such a manner that the said openings and closings take place simultaneously, which is difficult to obtain with the other systems of distribution of the pressure liquid.

Finally, owing to the fact that the four phases necessary for the operation of each piston (thrust of the liquid on one side of the piston, driving back of the liquid on the opposite side, thrust of the liquid on the second side of the said piston, and driving back of the liquid on the opposite side to said second side) are each determined by a valve controlled by its own cam, it is possible to change the sequence of the movements with the greatest of ease and with a minimum expense; the modification of a movement only necessitates either the replacing of a pair of cams of very small size, or even simply modifying said cams, or the addition of an adjustable throttle valve like the one described in the present specification.

In the example of application chosen, a group of machines has been shown diagrammatically, the hydraulic motions of which are synchronized by the distributor, it being possible for the drive of said distributor, in synchronism with the other members of the machine, which are driven hydraulically, to be of any kind.

In the specification, neither a by-pass, nor a relief valve has been shown. Of course, such accessories would be provided at the locations where they are necessary.

Similarly, in order to make the figures clearer, the retracting springs of the valves 11, 12, 13, etc. which are normally arranged on the heads of the said valves, have not been shown.

Of course, the device according to the present invention may be supplied with any liquid usually used for hydraulic motions: oil, water, glycerin, etc.

As has been explained, the invention relates to the hydraulic transmission and control of mechanical movements, and more particularly those of the up and down movements of the supports of containers or of the operative members, in machines for washing, filling, stoppering, capsuling, labelling, etc. bottles and other objects, and also to the transmission and the control of the reciprocating movements of the operative members in said machines.

The invention was designed for the purpose of constructing equipment in which the usual combinations of levers, rods, cams, etc. were replaced by the combination of hydraulic pistons with a pressure liquid distributor producing the movements of said pistons at the required instants and during the required periods.

This arrangement is for the final purpose of obtaining equipment comprising a small number of members, members which are simple and easy to keep in order, members which can be readily adjusted and exert forces which are limited.

Some other objects of the invention are to simplify further the construction of the equipment by reducing the number of pipes supplying the hydraulic cylinders, and by reducing the number of phases required of the distributor; to facilitate the adjustment of the travel of certain members such as the bottle supports effecting an up and down movement, by acting on the stroke of the hydraulic pistons which control them; and to eliminate the stuffing-boxes of certain hydraulic cylinders.

One of the advantages provided by this invention consists in the fact that the adjustment of the return stroke of the hydraulic piston, when said piston is connected to a bottle support effecting an up and down movement, enables the upper plane of each bottle support to be adjusted exactly to the same height as the plane of circulation of the bottles of an automatic conveyor or feed table which by lateral movement feeds each bottle to the support for which it is intended. This peculiarity makes it possible to prevent any stumbling of the bottles when same leave their conveyor or feed table and slide on to their support, or conversely.

Another advantage is obtained by the use, in combination with a hydraulic piston, of an opposing spring for returning said piston in one of its two directions of translation.

In fact, not only does this arrangement enable one pipe out of two to be eliminated, but it furthermore makes it possible only to introduce the liquid into the cylinder on the opposite side to the piston rod, thereby eliminating the necessity of using a stuffing-box or other packing in that end of the cylinder through which said rod of the hydraulic piston passes.

A still further advantage consists in the simplication of the construction of the distributor by the elimination of ports in same. This is appreciable in particular in the case of the application of the hydraulic motions to labelling machines which may have numerous motions to which this improvement can be applied.

It should be noted, however, that the use of the opposing spring, as mentioned above, should preferably be confined to the members whose stroke is comparatively short and whose working pressure is fairly small, since in the case of a long stroke, the force to be overcome owing to the tension of the spring in question by the pressure of the piston might be excessive.

But, by way of a modification, it would be possible to replace the spring by a counterweight arranged in a suitable manner. Of course, in these two cases (use of an opposing spring or counterweight), the said opposing element can be used either for the "forward" stroke of the hydraulic piston, or for its "return" stroke.

In the Fig. 6, 71 is the sole of the label box supporting carriage, 72 is the supporting carriage and 73 the label box which is secured to said supporting carriage; 74 is the body of the hydraulic cylinder, 75 is the hydraulic piston and 76 the rod of said piston; 77 is the opposing spring, 78 is the end face of the piston and 79 the inlet and outlet pipe for the pressure liquid. The rod 76 of the piston is secured to the carriage 72 by the portion 80.

When the pressure is supplied to the cylinder 74 through the pipe 79, it is exerted on the face 78 of the piston 75 and said piston moves forward, carrying with it the supporting carriage 72 of the label box. At the same time as the piston 75 moves forwards, it compresses the opposing spring 77.

The work to be done is then effected (for example that which consists in pressing the packet of labels against a pair of gummed blades so as to deposit thereon the first label of said packet) and then a distributor, not shown, places the pipe 79 in communication with the atmosphere.

At this instant, the oil contained in the cylinder 74 is no longer retained and the opposing spring 77 which had been compressed, expands and pushes back the hydraulic piston to its starting position, at the same time driving the liquid out of the cylinder which contained it, the cylinder being relieved of any pressure against the piston in question.

It will be observed, in the arrangement shown by way of example, that the piston 75 is extended on the side on which the spring is located, this being so as to limit the stroke to a strict minimum and avoid unnecessarily compressing the spring in case the stroke of the carriage 72 gets out of adjustment.

But of course, the limitation of this stroke of the carriage could just as well be obtained otherwise, in particular by means of an adjustable abutment 81.

In Fig. 7 82 is the bottle being supported, 83 is the bottle supporting pedestal and 84 is its upper plane; 85 is the plane of circulation of the bottles on the feeding and removing conveyor for same, 75 is the hydraulic piston and 76 its rod, 74 is the hydraulic cylinder, 86 is the adjustable abutment passing through the end 74ª of the cylinder 74.

The figure is self-explanatory and it will be understood that, in order to re-adjust the upper plane 84 to the height of the circulation plane 85 when it is too low, it is only necessary to screw the abutment 86 into the end of the cylinder on which it is mounted; similarly, in order to effect the reverse operation, it is only necessary to unscrew said abutment 86.

If it were of any advantage, it will be realised that it would be quite possible to use jointly the opposing spring and the abutment screw at the end of the cylinder, as shown in Fig. 6.

As explained, the invention relates to the hydraulic transmission and control of mechanical movements, and more particularly to those of the up and down movements of the supports for containers or objects, and also to those of the reciprocating movements of the operative members in machines for washing, filling, stoppering, capsuling, labelling, etc., bottles, jars, or other containers or objects.

The invention is applicable both to individual machines effecting a single operation on the containers or objects in question, and to multiple machines or groups of machines effecting several operations on the said objects, the various movements of which have to be effected at a predetermined cadence and in a predetermined sequence.

The invention relates to the labelling stations incorporated in the aforesaid machines or groups of machines, whether the said labelling stations themselves form individual labelling machines, or whether they are used as accessory devices in conjunction with the supply and removal of members for the said objects (conveyors, bottle-carrier, trays, etc.) in the aforesaid groups of machines.

In order to simplify the ensuing explanations, the word "bottle" will be assumed to represent the object to be labelled whatever such object may be, and the word "label" will be used in the singular, its being understood that the devices hereinafter described apply just as well to labelling stations affixing several labels, medallions, seals, etc.

It is known that labelling stations comprise the following operative members: sizing and label pick-up spatulas, sizing roller, label box, label affixing members, and members for smoothing and stretching the said label, etc.

It is also known that, in these apparatus, the aforesaid operative members have reciprocating or up and down movements and that these movements are usually obtained by means of kinematic combinations such as levers, connecting rods, cams, clutches, etc., and that very often said movements are complicated and intermingled, and that they make the machines difficultly accessible, both for the upkeep and for the adjustments.

These drawbacks are the more marked for labelling stations, as these kinematic motions are exposed to receive projections of gum, which clog them and are the cause of their faulty operation.

Another purpose of the invention is to overcome these drawbacks.

In Figs. 8-10, 41 is a distributor of any kind, shown diagrammatically and assumed to be operated by a motor which may also be of any kind, itself operating the bottle-carrier turret 42.

43 is a hydraulic piston connected to the pair of spatulas 44, the purpose of which is to receive a layer of size and to take a label and hold it opposite the bottle 49 to be labelled; 45 is a sizing roller, 46 is a hydraulic piston of a cylinder 56, which periodically pushes the sizing roller 45 on to the pair of spatulas 44; 47 is the label box, 48 is another hydraulic piston of a cylinder 58, which periodically pushes the said label box towards the pair of sized spatulas; 49 is the bottle to be labelled; 50 is a hydraulic piston of a cylinder 60, which periodically pushes the labelling pincers 51. The labelling pincers 51 are intended to press the label on to the bottle 49, and the smoothing pad 52 presses against the affixed label, pushed by the hydraulic piston 53 of the cylinder 63.

The operation is as follows:

The distributor 41, shown diagrammatically, is operated by a motor which also operates the bottle-carrier turret 42 in synchronism. Said distributor is supplied by any source of pressure liquid, for example an oil pump.

As soon as the distributor is operating, it supplies the liquid to the various cylinders, and it does this at the required instants and during the required times. The various phases then take place as follows:

The pressure liquid first of all is directed under the piston 43 which is lifted and which lifts the pair of spatulas 44 to which it is connected. As soon as the upper edge of said pair of spatulas 44 reaches the level of the sizing roller 45, the pressure liquid is directed behind the piston 46 and said piston pushes the sizing roller 45 into contact with the pair of spatulas 44 in order to cover it as it passes with the layer of size necessary for the subsequent picking up of the label.

The pair of spatulas 44 continue to move upwards and, as soon as a sufficient surface has been sized, the pressure liquid is directed on to the other side of the piston 46, and returns the sizing roller 45 backwards; during this time, the pair of spatulas has continued and completed its upward travel and comes opposite the label box 47.

The pressure liquid then is directed behind the piston 48 and said piston pushes the label box 47 against the sized part of the pair of spatulas 44. Immediately the pressure liquid is directed on to the opposite side of said piston 48 and the label box returns backwards, leaving the first label of its packet on the sized surface of the pair of spatulas.

At this instant, the pressure liquid changes its direction on the piston 43 and said piston is moved downwards, carrying with it the pair of spatulas 44.

When said pair of spatulas reaches the low point of its travel, the label which it carries is opposite the bottle to be labelled 49. Then the pressure liquid is directed behind the piston 50, which pushes the pincers 51, the function of which is to push the label and press it against the bottle 49.

When this operation has been effected, the pressure liquid changes its direction on the piston 50 and the pincers 11 returns backwards.

When the foregoing operations have been effected, the bottle-carrier turret 42 rotates and the bottle 49 comes opposite the smoothing pad 52.

The pressure liquid then is directed behind its piston 53 and the said smoothing pad is pressed against the label which has already been affixed to the bottle, thus completing the various phases of the labelling operation, after which, the pressure liquid changes its direction on the piston 53 and the smoothing pad 52 returns backward.

But during this operation for smoothing the label, the pressure liquid has returned under the piston 43, and the operations have started again; a fresh labelled bottle will again come in front of the smoothing pad 52, and the operations will continue and will thus be repeated until the distributor is stopped.

The invention relates to the stoppering stations incorporated in the machines or groups of machines hereinbefore referred to, whether said stoppering stations themselves form separate stoppering machines, or whether they are used as auxiliary devices in combination with the members for feeding and removing said objects (conveyors, bottle-carrier plates, etc.) in the aforesaid groups of machines.

It is known that stoppering stations comprise the following operative members: members for distributing the corks; members for compressing said corks; up and down movement of the bottles relatively to the corking members, or downward and upward movement of said corking members relatively to the bottles; members for pushing in the corks.

It is also known that, in these machines, the necessary movements of the members referred to above are usually obtained by means of kinematic combinations such as connecting rods, levers, cams, clutches, etc., and that these motions are often complicated, that they may be noisy, and that, in certain cases, they are liable to rapid wear.

Other objects of the invention are to overcome these drawbacks.

Fig. 11 is an elevational view, in section, of a corking station comprising all the movements which enable it to operate, either as a separate machine, or as an auxiliary station in a group of synchronized machines.

In said figure, 91 is a framework supporting the motions, 92 is a bottle support adapted to effect a periodic up and down movement, 93 is the corking head of which 94 is a stationary jaw for compressing the cork 105 before corking and 95 the movable jaw which moves towards the stationary jaw when said cork is to be compressed.

96 is a tube for distributing the corks of a known system. 97 is an inserting piston which is intended to push the cork 105, which has been previously distributed and then compressed, into the bottle 106.

The support 92 is connected to a hydraulic piston 98 sliding in a cylinder 99; the movable jaw 95 is connected to a second hydraulic piston 100 sliding in the cylinder 101 and the inserting piston is connected to a third hydraulic piston 102 sliding in the cylinder 103.

It will be seen that the chief movements to be obtained are: (1) the up and down movement of the bottle support relatively to the corking head, (2) the reciprocating movement of the movable compressor, and (3) the reciprocating movement of the inserting piston.

In known machines, these three movements are obtained either solely by means of kinematic movements, or partly by means of hydraulics, but only for secondary operations (the compensation of the differences of height of bottles for example) and in combination with other mechanical movements.

In the present invention, on the contrary, an effort has been made to eliminate the mechanisms between each hydraulic member and the member actuated, and on the other hand the movements have been synchronized with one another by means of an independent member, such as a distributor 104, which can be located at any available point in the corking station, or outside same or again in another machine to which it is connected.

It follows that:

In the first place, since the number of members interposed between the source of pressure and the driven member is reduced or eliminated, any risk of play is itself eliminated;

In the second place, the hydraulic pressure eliminates a large part of the springs usually used;

In the third place, the wear of the members and in particular that of the cams, which only support the forces on one line, is also reduced: this is particularly appreciable for the members controlling the compression of the corks, and also those driving in said corks.

Finally, the use of three static cylinders, instead of a large number of kinematic motions, simplifies the questions of lubrication and servicing.

The machine operates as follows:

A bottle 106 having been placed on the support 92 either by hand or mechanically, said support is pushed upwards by the piston 98 and abuts with its neck against the corking head 93.

Meanwhile a cork 105 has been distributed between the stationary jaw 94 and the movable jaw 95, and the hydraulic piston 100 has moved said movable jaw towards the stationary jaw.

At the instant when the cork 105 is completely compressed and is located above the bottle 16, the inserting piston 97 descends, being pushed by the piston 102, and then moves upwards again into its original position.

For its part, the bottle support 92 moves downwards again, urged by the hydraulic piston 98 and the movable jaw 95 moves back, pushed by the piston 100.

The bottle 106 is then removed and replaced by a fresh bottle to be corked, and the operations are ready to start again.

The cylinders 99, 101 and 103 alternately receive and exhaust the pressure liquid acting respectively on the pistons 98, 100 and 102 which are driven and controlled by the distributor 104.

It is obvious that it is possible, without exceeding the scope of the invention, to imagine variants and improvements of details, and also to make use of equivalent means.

I claim:

1. A machine for processing articles comprising, in combination, a plurality of independent parts which are movably mounted on the machine; a plurality of hydraulic operating means each connected to one of said independent parts for moving the same, said plurality of hydraulic operating means each including cylinder and piston parts one of which is fixedly mounted on a stationary part of the machine; a pressure liquid distributor having an outer casing which is fixedly mounted at a location distant from the machine, so that the said casing remains stationary during the operation of the machine; a plurality of pressure liquid conduits each connected at one end to said pressure liquid distributor and at the other end to one of said hydraulic operating means; a plurality of pressure liquid valves in said pressure liquid distributor each adapted to open and close one of said pressure liquid conduits; a movably mounted operating member common to said pressure liquid valves; a plurality of individual actuating members fixedly mounted on said common operating member so as to move with the same, and each of said individual actuating members being permanently associated with one of said pressure liquid valves so as to independently operate the same during movement of said common operating member; and means for moving said common operating member in synchronism with the operation of the machine, whereby the actuating members mounted on said operating member actuate said valves so as to open and close said pressure liquid conduits and thereby cause said hydraulic operating means to move said independent parts of the machine.

2. A machine for processing articles comprising, in combination, a plurality of independent parts which are movably mounted on the machine; a plurality of hydraulic operating means each connected to one of said independent parts for moving the same, said plurality of hydraulic operating means each including cylinder and piston parts one of which is fixedly mounted on a stationary part of the machine; a pressure liquid distributor having an outer casing which is fixedly mounted at a location distant from the machine, so that the said casing remains stationary during the operation of the machine; a plurality of pressure liquid conduits each connected at one end to said pressure liquid distributor and at the other end to one of said hydraulic operating means; a plurality of pressure liquid valves in said pressure liquid distributor each adapted to open and close one of said pressure liquid conduits; a movably mounted operating member common to said pressure liquid valves; a plurality of individual actuating members fixedly mounted on said common operating member so as to move with the same, and each of said individual actuating members permanently engaging one of said pressure liquid valves so as to independently operate the same during movement of said common operating member, said individual actuating members each being shaped so as to operate said pressure liquid valves during movement of said common operating member in a predetermined sequence and for predetermined different lengths of times; and means for moving said common operating member in synchronism with the operation of the machine, whereby the actuating members mounted on said operating member actuate said valves so as to open and close said pressure liquid conduits and thereby cause said hydraulic operating means to move said independent parts of the machine in a predetermined sequence and for predetermined different lengths of time.

3. A machine for processing articles comprising, in combination, a plurality of article supports movably mounted on the machine; a plurality of hydraulic operating means connected to each of said supports for moving the same, said plurality of hydraulic operating means each including cylinder and piston parts one of which is fixedly mounted on a stationary part of the machine; a pressure liquid distributor having an outer casing which is fixedly mounted at a location distant from the machine; a plurality of pressure liquid conduits each connected at one end to said pressure liquid distributor and at the other end to one of said hydraulic operating means; a plurality of pressure liquid valves in said pressure liquid distributor each adapted to open and close one of said pressure liquid conduits; a rotatably mounted cam shaft common to said pressure liquid valves; a plurality of individual cams fixedly mounted on said common cam shaft so as to rotate with the same, each of said cams permanently engaging one of said pressure liquid valves so as to independently operate the same during rotation of said common cam shaft, and said cams being shaped differently from each other so as to actuate said valves in a predetermined sequence and for different lengths of time; and means for rotating said common cam shaft, whereby said cams actuate said valves so as to open and close said pressure liquid conduits and thereby cause said hydraulic operating means to move said article supports in a predetermined sequence, for predetermined different lengths of time and to predetermined different extents.

4. Apparatus for hydraulically controlling the reciprocating motion of an operating member in a machine for performing an operation on bottles, said apparatus comprising, in combination, a piston connected to the operating member; a cylinder enclosing said piston to support the latter for reciprocating movement; a pair of conduits operatively connected to said cylinder, one of said conduits communicating with one end of said cylinder on one side of said piston and the other of said conduits communicating with the opposite end of said cylinder on the other side of said piston; and a hydraulic distributor communicating with said conduits for controlling flow of liquid therethrough, said hydraulic distributor comprising a first pair of valves operatively connected to said conduits for permitting liquid to flow through the same in one direction, a second pair of valves operatively connected to said conduits for permitting liquid to flow through the same in an opposite direction, a first pair of cams operatively engaging said first pair of valves for simultaneously moving the same, and a second pair of cams operatively engaging said second pair of valves for simultaneously moving the same at a different time from the movement of said first pair of valves by said first pair of cams, whereby the movement of said piston in one direction is controllable independently of the movement of said piston in an opposite direction.

5. An apparatus comprising a plurality of sets of elements, each of said sets having the construction defined in claim 4, and said apparatus having all of the cams and valves thereof enclosed in a single housing located distant from the cylinders of said sets and interconnected with the same through the conduits of said sets.

6. Apparatus for hydraulically controlling reciprocating motions in machines performing operations on bottles, said apparatus comprising, in combination, a hydraulic distributor having an outer casing, a plurality of pairs of first valves located in said casing, a plurality of pairs of second valves located in said casing, a plurality of pairs of first cams operatively engaging said pairs of first valves, respectively, for moving said pairs of first valves in a predetermined sequence and for moving each pair of first valves simultaneously, and a plurality of pairs of second cams operatively engaging said pairs of second valves for moving said pairs of second valves in a predetermined sequence and for moving each pair of second valves simultaneously; a plurality of pairs of conduits operatively connected to said pairs of first valves, respectively, for moving liquid in one direction through said conduits and said pairs of conduits being operatively connected to said pairs of second valves respectively for moving liquid through said conduits in an opposite direction; a plurality of cylinders respectively communicating with said plurality of pairs of conduits, each cylinder having one end communicating with one of said conduits and an opposite end communicating with another of said conduits; and a plurality of pistons respectively connected to operating members of the machines and being respectively located in said cylinders, whereby said cams and valves render the movement of said pistons independently controllable, said pairs of first cams and valves controlling the movement of said pistons in one direction and said pairs of second cams and valves controlling the movement of said pistons in an opposite direction so that the movement of each piston in one direction is controllable independently of its movement in the opposite direction.

7. An apparatus as defined in claim 4 and wherein said valves of each pair of valves are located opposite each other and in a slightly staggered relation, and wherein said cams of each pair of cams are located in side by side relation on a single support and respectively in alignment with said valves.

RENÉ DÉTREZ.

References Cited in the file of this patent

UNITED STATES PATENTS

| Number | Name | Date |
| --- | --- | --- |
| 1,375,364 | Clark | Apr. 19, 1921 |
| 1,905,065 | Scholl | Apr. 25, 1933 |
| 1,966,889 | Fagan et al. | July 17, 1934 |
| 2,078,040 | Taylor | Apr. 20, 1937 |
| 2,080,393 | Moore | May 11, 1937 |
| 2,127,964 | Ryan et al. | Aug. 23, 1938 |
| 2,138,271 | Fagan et al. | Nov. 29, 1938 |
| 2,147,366 | Fagan et al. | Feb. 14, 1939 |
| 2,170,469 | Carter | Aug. 22, 1939 |
| 2,225,336 | Foster et al. | Dec. 17, 1940 |
| 2,228,700 | Hamner et al. | Jan. 14, 1941 |
| 2,311,786 | Stewart et al. | Feb. 23, 1943 |
| 2,323,731 | Shetzline | July 6, 1943 |
| 2,333,545 | Meyer | Nov. 2, 1943 |
| 2,383,781 | Darrell | Aug. 28, 1945 |

FOREIGN PATENTS

| Number | Country | Date |
| --- | --- | --- |
| 522,298 | Great Britain | June 13, 1940 |